(12) United States Patent
Gordon (10) Patent No.: US 7,194,204 B2
(45) Date of Patent: *Mar. 20, 2007

(54) PHOTOGRAPHIC FIREARM APPARATUS AND METHOD

(76) Inventor: Terry J. Gordon, 1 Legend La., P.O. Box 303, Keeseville, NY (US) 12944

( * ) Notice: Subject to any disclaimer, the term of this patent is extended or adjusted under 35 U.S.C. 154(b) by 0 days.

This patent is subject to a terminal disclaimer.

(21) Appl. No.: 10/711,267

(22) Filed: Sep. 7, 2004

(65) Prior Publication Data

US 2005/0002668 A1  Jan. 6, 2005

Related U.S. Application Data

(63) Continuation of application No. 10/250,148, filed on Jun. 6, 2003, now Pat. No. 6,792,206, which is a continuation of application No. 10/063,033, filed on Mar. 13, 2002, now Pat. No. 6,580,876, which is a continuation of application No. 09/537,325, filed on Mar. 29, 2000, now Pat. No. 6,363,223.

(51) Int. Cl.
   *G03B 17/00*  (2006.01)

(52) U.S. Cl. ............... 396/263; 396/426; 396/429; 348/61; 348/552

(58) Field of Classification Search ........... 396/263, 396/426, 429, 502; 348/61, 143, 552
See application file for complete search history.

(56) References Cited

U.S. PATENT DOCUMENTS

| | | | |
|---|---|---|---|
| 2,282,680 A | * | 5/1942 | Sonne ..................... 396/426 |
| 2,664,797 A | * | 1/1954 | Thrasher .................. 396/426 |
| 3,545,356 A | | 12/1970 | Nielsen ................... 396/426 |
| 3,785,261 A | | 1/1974 | Ganteaume ............... 396/426 |
| 3,787,770 A | * | 1/1974 | Cote et al. ............... 324/178 |
| 3,849,910 A | * | 11/1974 | Greenly .................... 434/22 |
| 3,911,451 A | | 10/1975 | Vockenhuber ............ 396/426 |
| 4,219,263 A | | 8/1980 | West ........................ 396/432 |
| 4,290,219 A | | 9/1981 | Boller et al. ............... 42/106 |
| 4,309,095 A | | 1/1982 | Buckley ................... 396/420 |
| 4,385,227 A | * | 5/1983 | Bridges ...................... 377/2 |
| 4,630,911 A | | 12/1986 | Paul ........................ 396/426 |
| 4,643,159 A | * | 2/1987 | Ryan ....................... 396/429 |
| 4,835,621 A | | 5/1989 | Black ....................... 386/118 |
| 4,907,022 A | | 3/1990 | Myers ..................... 396/426 |
| 4,936,190 A | | 6/1990 | Pilcher, II ................. 89/41.05 |

(Continued)

FOREIGN PATENT DOCUMENTS

WO    WO 97/25583    7/1997

*Primary Examiner*—Christopher Mahoney
(74) *Attorney, Agent, or Firm*—Jay R. Yablon (57) ABSTRACT

A telescopic firearm scope/sight which is fully integrated with a compact digital camera, and which has size, shape and weight characteristics that are substantially the same as those of a conventional, camera-less telescopic scope, is used to photograph a target proximate the instant at which the target is fired upon. To configure the weapon for photography and firing, the scope is simply placed on the firearm in the same manner as a conventional scope, and the firearm is then fired in the conventional manner. Photographs are recorded, alternatively, in response to the sound of, or the recoil from, the firearm firing. An alternative embodiment eliminates the telescopic sight, but maintains all of the digital photography components, and is particularly useful for smaller-scale firearms such as pistols.

16 Claims, 4 Drawing Sheets

U.S. PATENT DOCUMENTS

| | | | |
|---|---|---|---|
| 4,970,589 A | 11/1990 | Hanson et al. | 348/158 |
| 4,989,024 A | 1/1991 | Myers | 396/426 |
| 5,020,262 A | 6/1991 | Pena | 42/106 |
| 5,285,273 A | 2/1994 | James et al. | 348/169 |
| 5,287,644 A | 2/1994 | Bolduc | 42/106 |
| 5,347,740 A | 9/1994 | Rather et al. | 42/94 |
| 5,366,229 A | 11/1994 | Suzuki | 463/5 |
| 5,442,483 A | 8/1995 | Monari | 359/638 |
| 5,478,077 A * | 12/1995 | Miyahara | 473/154 |
| 5,491,919 A | 2/1996 | Rather et al. | 42/94 |
| 5,589,903 A | 12/1996 | Speggiorin | 396/428 |
| 5,991,043 A | 11/1999 | Andersson et al. | 356/400 |
| 6,000,163 A | 12/1999 | Gordon | 42/119 |
| 6,178,141 B1 * | 1/2001 | Duckworth et al. | 367/127 |
| 6,363,223 B1 | 3/2002 | Gordon | 396/263 |
| 6,374,053 B1 * | 4/2002 | Raposa et al. | 396/263 |
| 6,580,876 B1 | 6/2003 | Gordon | 396/263 |
| 6,792,206 B2 | 9/2004 | Gordon | |

* cited by examiner

PHOTOGRAPHIC FIREARM APPARATUS AND METHOD

CROSS-REFERENCE TO RELATED APPLICATIONS

This application is a continuation of application Ser. No. 10/250,148 filed Jun. 6, 2003, now U.S. Pat. No. 6,792,206 issued Sep. 14, 2004, which in turn is a continuation of application Ser. No. 10/063,033 filed Mar. 13, 2002, now U.S. Pat. No. 6,580,876 issued Jun. 17, 2003, which in turn is a continuation of application Ser. No. 09/537,325 filed Mar. 29, 2000, now U.S. Pat. No. 6,363,223 issued Mar. 26, 2002.

BACKGROUND OF INVENTION

This field relates to the fields of both firearms and photography, an particularly, relates to an improved device and method for photographing a firearm target in connection with the shooting thereof.

Game hunting is a popular recreational pastime in the United States and many other countries of the world. Hunters have long prized their kills beyond their value as food and/or skin, and it is common practice, for example, to mount the head of a deer or other hunting "kill" on a wall as a trophy, to display one's past successes. Even more interest can be added, however, if the hunter has a simple, straightforward way to photograph his or her prey/target just before, during, and/or after the kill, as desired by the hunter.

Even for practice purposes, the ability to photograph a target in connection with the firing of a shot can assist the hunter to improve his or her accuracy and adjust his or her rifle scope, by providing an independent photographic record of what was viewed through the scope just as a shot was fired, in contrast with where the shot actually struck on the target.

The ability to photograph a target in connection with the shooting thereof has possible military and law-enforcement applications as well. For example, the evidentiary record for recent high-profile court cases involving controversial shootings of citizens by law-enforcement personnel could have been greatly enhanced if the weapons used in these shootings had produced photographs of the target at the time of the shooting.

Several prior art devices do combine a rifle and rifle scope with a photographic camera, yet all of these devices have severe limitations that make them very cumbersome to use and also limit the flexibility of the shooter to precisely determine the timing of the photographic activity in relation to the firing of the weapon.

U.S. Pat. No. 5,020,262, for example, discloses a still picture camera (30) mounted onto a special housing (12) which is in turn mounted onto a standard telescopic sight (20). The housing (12) transfers the image of the target through the sight (20) to the camera (30) (column 3, lines 52–56). The camera (30) is a separate, conventional camera which is activated to photograph a single still image when the rifle trigger (11B) is pulled to fire a shot, via a cable mechanism (30B) connecting the trigger (11B) to the shutter release (30A) of the camera (30) (column 4, lines 39–50).

This device requires an unnatural and cumbersome modification to the rifle, since one must mount a separate camera housing (12) as well as a separate camera (30) to the rifle sight (20). This adds extra steps to the assembly of the rifle, and it substantially alters both the shape and the weight distribution of the telescopic sight. In addition, the cable connection (30B) between trigger (11B) and shutter release (30A) of the camera (30) adds even further work to the assembly of the rifle, and places a new, potentially interfering device (cable (30B)) in direct contact with the trigger. Further, a trigger-activated approach such as disclosed in this patent would not enable the hunter to precisely fine tune the instant at which the photograph is taken relative to the firing of the shot.

U.S. Pat. No. 4,309,095 discloses a camera mounting bracket (18) which supports a camera (12) in substantially parallel orientation to the line of sight of the telescopic sight (16). As in U.S. Pat. No. 5,020,062, the camera (12) is activated by means of a cable connection (24) to the rifle trigger (30) using a plunger-type button (32). This too makes setup more cumbersome, interferes with the trigger, and limits the opportunity to fine tune the instant at which the photograph is take relative to the actual firing of a shot. By requiring a bracket (18) separate from the sight (16), as well as a separate camera (12), the rifle setup remains more cumbersome than a conventional (camera-less) setup, and the shape and weight distribution of the rifle and rifle scope are altered. Additionally, since the camera (12) in this arrangement does not obtain its photographic image through the scope, one further needs to ensure proper camera alignment with respect to the line of sight, and one could not obtain a substantially "exact" replica of what the hunter saw through the scope just as the shot was fired.

U.S. Pat. No. 5,287,644, is simply a rifle simulation, wherein the camera is again trigger activated, and wherein the rifle and scope, when assembled for photography, is much more cumbersome than a conventional rifle and scope.

U.S. Pat. Nos. 3,545,356; 3,785,261; 3,911,451; 4,936,190; 4,970,589; and 5,285,273 all appear to combine a telescope and camera site with a firearm, however, they lack sequential timing for photography and the recording of photographic information at specified time intervals.

It would be desirable, therefore, to provide a means and method for taking pictures of a target proximate the instant at which a shot is fired from a weapon that does not require any connection to or activation from the rifle trigger.

It would further be desirable to eliminate the need for a separate camera and camera housing.

It would further be desirable to take these pictures through a fully-integrated photographic rifle scope that combines all necessary telescopic and photographic components into a complete, compact unitary device that is substantially identical in shape and weight distribution to a conventional, camera-less rifle scope.

It would further be desirable to enable the shooter to fine tune with precision, the exact instant at which the target photograph is taken in relation to the firing of the rifle.

It would further be desirable to enable a weapon such as a pistol, which does not ordinarily have a telescopic scope, to nevertheless take photographs of its target at or near the time of shooting.

SUMMARY OF INVENTION

One embodiment of the invention disclosed herein is a telescopic rifle scope/sight which is fully integrated with a compact digital camera, and which has size, shape and weight characteristics that are substantially the same as those of a conventional, camera-less telescopic scope. To configure the weapon for photography and firing, the scope is simply placed on the rifle in the same manner as a conventional scope without any additional steps, and the rifle is then fired in the conventional manner.

An alternative embodiment of the invention eliminates the telescopic rifle scope, but maintains the compact digital camera. This embodiment is particularly useful in combination with pistols and similar small-scale firearms which ordinarily do not include a telescopic scope, and in which the shooter views the target directly without the aid of a scope. To configure the weapon for this embodiment, the digital camera and other related components are simply placed on the pistol or similar firearm using a suitable mount. Alternatively, a pistol or similar firearm can be manufactured at the outset to include the digital camera and the other related components of this embodiment.

In the telescopic sight embodiments, the compact digital camera is preferably initiated by an infrared detector which detects body heat from the hunter's face when the rifle is moved into position for firing and the hunter's eye is moved into position for viewing thorough the scope. Once initiated, the digital camera photographs a series of images spaced apart from one another by fractions of a second (i.e., at a given frame rate such as, for example, 30 frames per second), and stores these images in an image memory. The hunter then pulls the trigger and fires the rifle in the conventional way. Once the shot is fired, an acoustic detector, or, alternatively, an acceleration detector detects either the sharp sound of the firing or the recoil due to the firing, and sends a signal to the digital camera to permanently record one or more of the images it contains.

In the embodiments that eliminate the telescopic scope, initiation preferably takes place by detecting the removal of the pistol from its holster or other concealed location, using optical or kinetic detection means.

By timing the recording of the photograph with reference to the actual crack of the firing, or the actual recoil of the firing, and by having information on the distance of the target and the speed of the ammunition, this device enables the hunter to fine tune the precise instant at which a photograph is recorded relative to both the firing of the weapon and the bullet striking its target. Further, no cumbersome and interfering connection need be established between trigger and camera.

BRIEF DESCRIPTION OF DRAWINGS

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION

Figure 1:
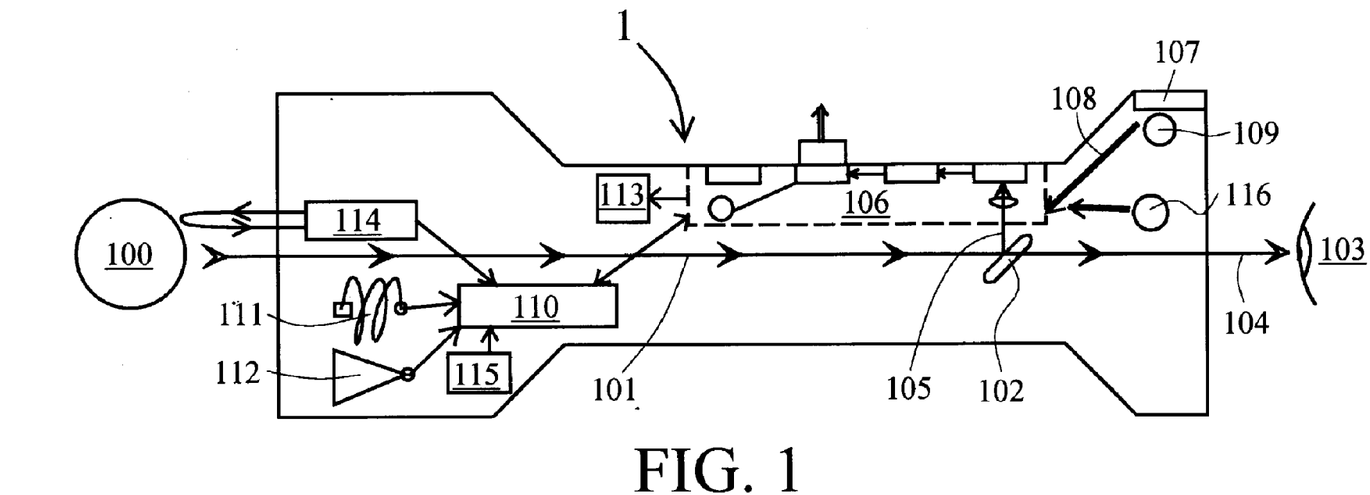
FIG. 1 is a plan view of a photographic and telescopic rifle scope according to a first primary embodiment of the invention, with schematic illustration of its various components.
Figure 4:
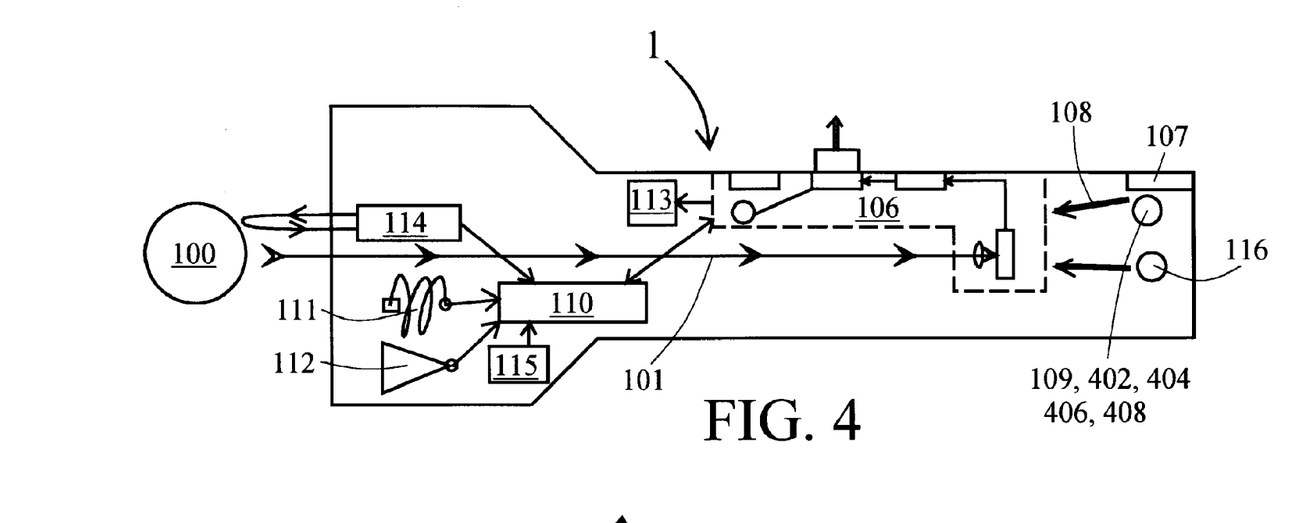
FIG. 4 is a plan view of a digital camera and its related components, according to a second primary embodiment of the invention which eliminates the telescopic scope aspects of FIG. 1 but maintain all other aspects thereof, with schematic illustration of its various components.

FIGS. 1 and 4 illustrate the photographic firearm apparatus 1 of two primary embodiments of the invention. In FIG. 1, a target image 100 is sighted through photographic firearm apparatus 1 including a telescopic scope, and light from that image travels through photographic firearm apparatus 1 along the direction indicated by arrows of line 101. Image delivery means 102 such as—but not limited to—a split prism similar to that employed in U.S. Pat. No. 5,020,262 (as component 16 therein) has a reflective surface on one side, and allows target image 100 to pass through to the hunter's eye 103 along line 104, and also to be reflected upward along line 105 and delivered into a digital photography means 106. It is understood that someone of ordinary skill in the optical arts may utilize equally-suitable means to deliver target image 100 to digital photography means 106, within the scope of this disclosure and its associated claims. This embodiment of FIG. 1 is particularly suited to rifles and other large, ling-range forearms.

FIG. 4 eliminates the telescopic scope of FIG. 1, but maintains all of the other elements. Target image 100 is sighted directly by the shooter without viewing the target through any type of scope. This is the conventional practice, for example, in firing a pistol rather than a rifle. Thus, image delivery means 102 such as a split prism is not necessary, since the image traveling along line of sight 101 need not be delivered to both the hunter's eye 103 and digital photography means 106, but only to digital photography means 106. The image presented to digital photography means 106 may still be a telescopic (magnified) image, or not, as desired. But the key difference between FIG. 1 and FIG. 4 is that in FIG. 1, target image 100 is viewed by the shooter through photographic firearm apparatus 1, while in FIG. 4 it is viewed directly by the shooter without the aid of photographic firearm apparatus 1. So in FIG. 4, it is only necessary that target image 100 be delivered to digital photography means 106.

Figure 3:
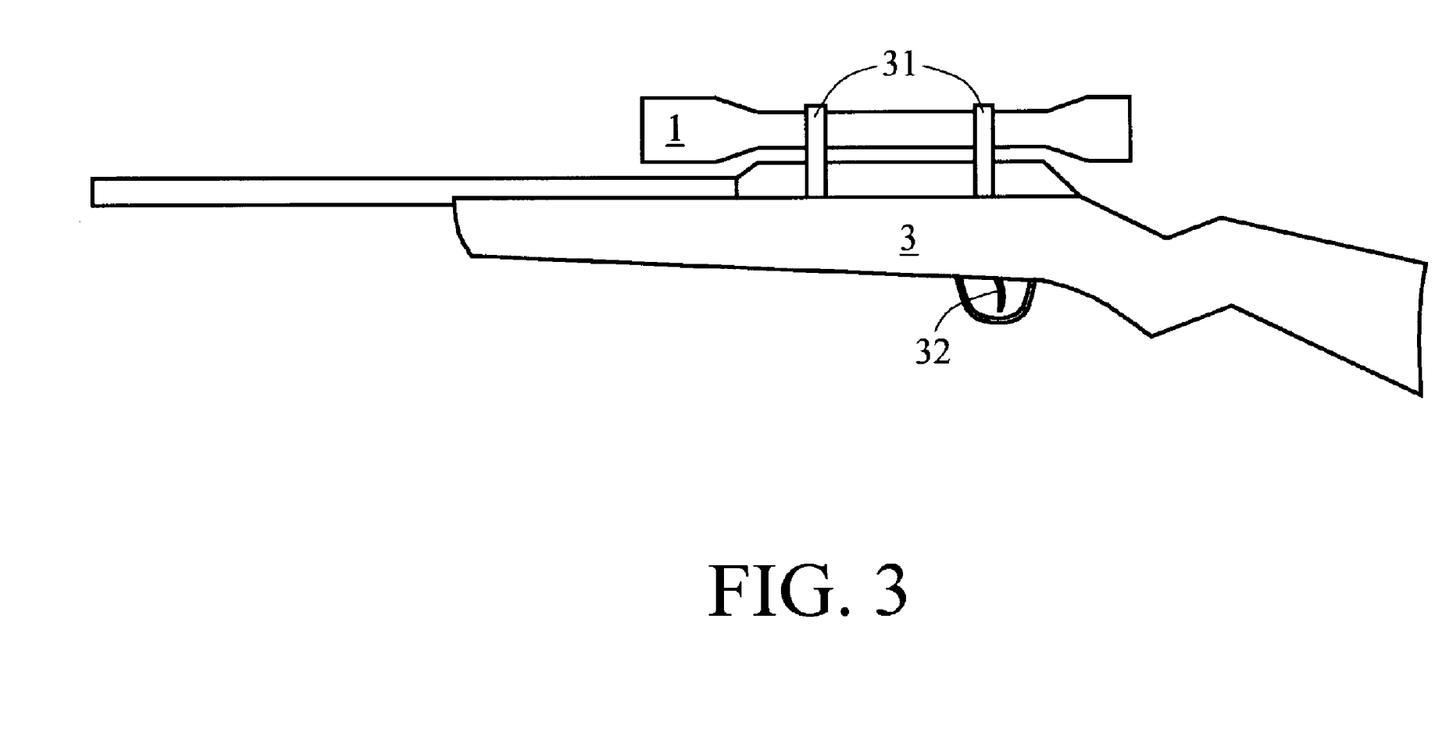
FIG. 3 is a plan view of the photographic rifle scope according to the embodiment of FIG. 1 as mounted for use on a rifle or similar firearm.

When photographic firearm apparatus 1 is mounted to a large, long-range firearm 3 such as a rifle with conventional mounting hardware 31 and trigger 32 as shown in FIG. 3, an infrared detector 107 (such as heat detectors well-known in the art) located proximate the viewing end of photographic firearm apparatus 1 detects a change in nearby heat due to the proximity of infrared detector 107 to the hunter's face, and consequently activates (108) photography means 106, in a preferred embodiment. In an alternative preferred embodiment, the hunter uses a manual switch 109 to activate (108) photography means 106. Infrared detector 107 may also comprise a retinal detector (such retinal detectors are an elemental component known in the art) which detect the presence of a human eye, so that activation only takes place once someone looks through the rifle scope.

Figure 6:
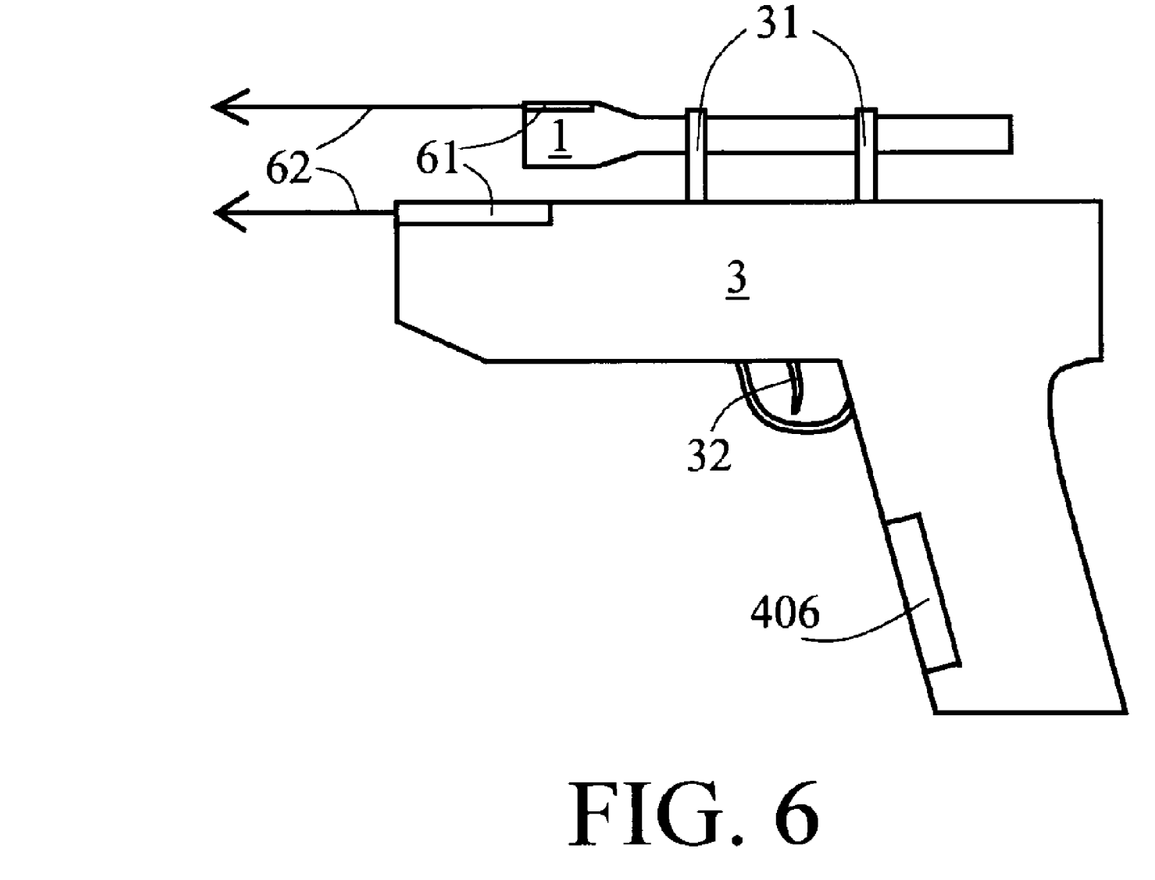
FIG. 6 is a plan view of the embodiment of FIG. 4 as mounted for use on a pistol or similar firearm.

When photographic firearm apparatus 1 is used in connection with a small short-range firearm 3 such as a pistol as shown in FIG. 6, an optical element 402 detecting a change in the light striking photographic firearm apparatus 1 when it is removed from a holster or other concealed location activates (108) photography means 106. Alternatively, a suitable motion detector 404 can be used to detect the kinetic motion of firearm 3 as it is being drawn, and to thereby activate (108) photography means 106. Manual switch 109 also remains an option to activate (108) photography means 106. Alternatively, a pressure sensor 406 can be used to detect when the firearm handle is being gripped with a predetermined pressure, to activate (108) photography means 106. Note that pressure sensor 406 is also illustrated in connection with the pistol handle of FIG. 6, so that FIGS. 4 and 6 together schematically illustrate that the pressure detected on the grip (FIG. 6) causes the photography means 106 to be activated (FIG. 4). Alternatively, an electronic sensor 408 can be used to detect when the firearm is being removed from a holster or other concealed location, to activate (108) photography means 106. For example, not limitation, the holster can include a magnet, and the electronic sensor 408 can include a magnetic sensor. When firearm 3 is removed from its holster, the magnetic sensor is removed from proximate the magnetic field, and this removal from the magnetic field causes electronic sensor 408 to signal for activation (108) of photography means 106. Other substitutions or equivalents for all of the above detectors are also considered to be within the scope of this disclosure and its associated claims. Similarly, use of the aforementioned sensors, as appropriate, is considered to be within the disclosure and associated claims for both a long-range firearm such as a rifle, and a short-range forearm such as a pistol; in short, for all firearms for which a given detector is sensible. These detectors shall be referred to collectively as activation detectors which detect some specified condition and activate 108 photography means 106 in response thereto.

Figure 2:
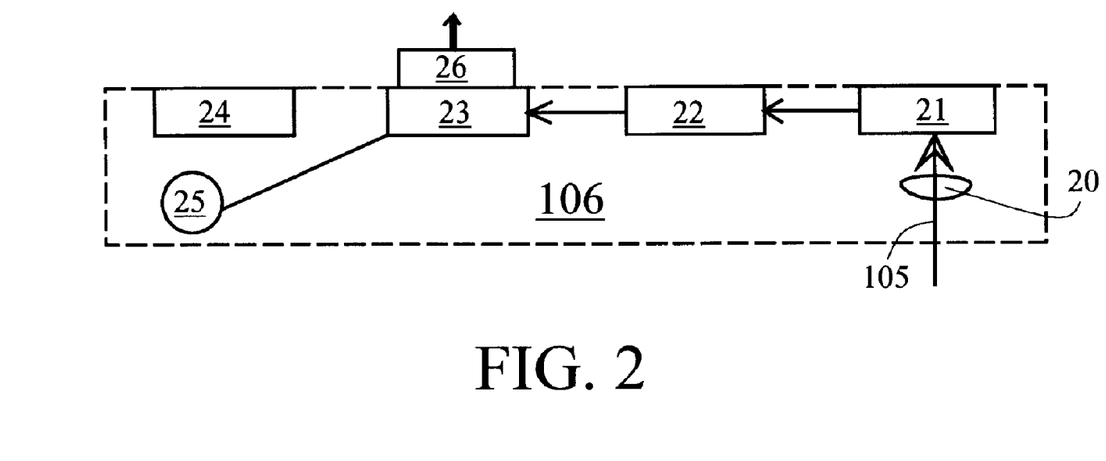
FIG. 2 is a schematic view of the photographic components of this rifle scope according to the embodiment of FIG. 1.
Figure 5:
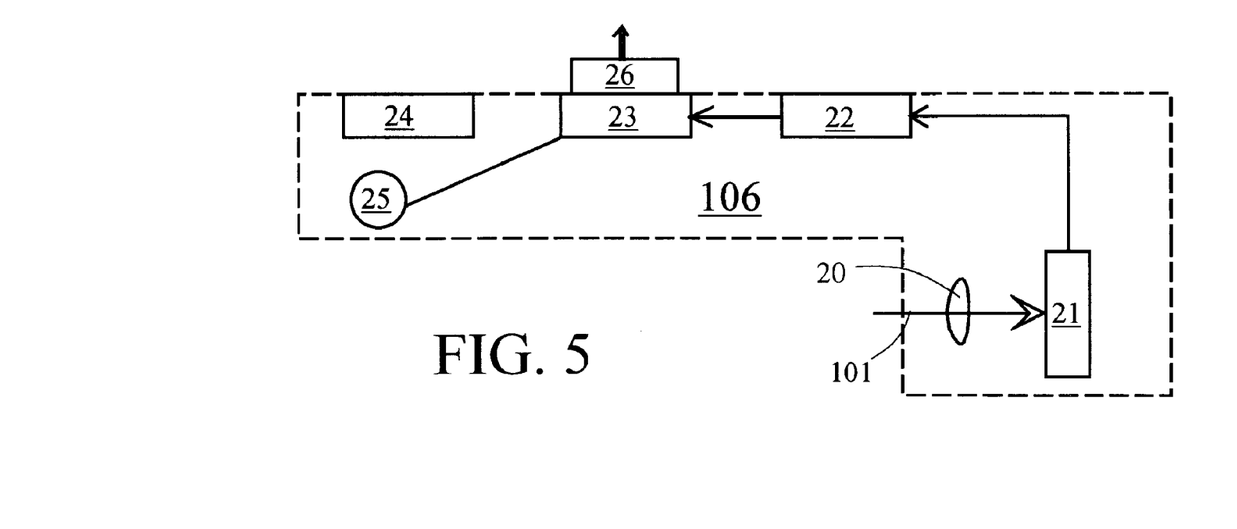
FIG. 5 is a schematic view of the photographic components of the embodiment of FIG. 4.

FIGS. 2 and 5 illustrate in further detail, the configuration and operation of digital photography means 106, for both primary embodiments. In its preferred embodiments, digital photography means 106 makes use of digital photographic technologies that have been developed in the recent years. The principles and operational methods for these technologies are well known in the art.

Once digital photography means 106 is activated (108), reflected image 105 in FIG. 1, or the input target image traveling along 101 as in FIG. 4, passes through a photographic lens 20 and is captured onto a digital imaging array 21 comprising a series of light-sensitive computer chips, as known in the art. At present, the two types of chip most widely used in digital imaging arrays such as 21 are charge-coupled devices (CCD) and complimentary metal-oxide semiconductors (CMOS). It is recognized, however, that new or improved digital imaging arrays 21 may be developed in the future the use of which, in accordance with this invention, would be fully encompassed by this disclosure and its associated claims.

Once light from the target image 100 strikes imaging array 21, the electrical charge generated thereby is then analyzed and translated into a digital image by an imaging processor 22, as known in the art. Optionally, as part of image processing (22), the image can be "flipped" to compensate for the parity reversal that takes place when it is reflected off of split prism 102 in the embodiment of FIG. 1. This processed digital image is in turn saved into an image memory 23. The image memory 23 can be an on-board memory (e.g., non-removable), or it can be removable (e.g., a removable memory card). There are of course a wide range of computer disk-type storage devices known in the art (e.g., hard disk drives, floppy disk drives, miniature memory cards, solid state devices, etc.) which can be used to provide image memory 23. As is common in the art, images stored in image memory 23 can be erased as desired, and thus the storage space of memory 23 can be reused indefinitely, as desired. That is, image memory 23 is a read/write memory in the conventional fashion. Similarly, specified images can be marked to be saved, i.e., protected from deletion until the programmer takes further action to delete them. Photography means 106 is of course powered overall by a power source 24, which may be a battery or similar power source known and used in the art to power digital cameras.

Once a single image has been produced, i.e., captured (21), processed (22) and stored (23) as described, a second image, and subsequent images, are similarly produced at fixed, small time intervals. Common variables in digital photography include the frame rate (i.e., how many still images are produced, per second), resolution (i.e., pixel density), and storage capacity (i.e., how many distinct still images can be stored in image memory 23, which in turn depends, among other things, on frame rate and resolution). These variables depend on the specific components used for each of imaging array 21, processor 22 and image memory 23, and for a purchaser of a digital photography device, these will in turn be related to cost. However, it is well within the ability of presently-available, off-the-shelf digital photography technology to record at 30 frames per second, capture over 500,000 color pixels, and store several thousand distinct still images. For purposes of the discussion to follow—but not to limit the disclosure or claims in any way—it is assumed that 30 still images per second are captured (21), processed (22) and stored (23), and that the image memory 23 is capable of storing at least several (e.g., five) seconds worth of still images (hence, approximately 150 stills), at whatever resolution is desired.

When firearm 3 with photographic firearm apparatus 1 is raised for firing and photography means 106 is activated (108) as described above (heat 107, manual 109, optical 402 or kinetic 404), imaging array 21, processor 22 and image memory 23 begin to capture (21), process (22) and store (23) images of the target at—for example only—the rate of 30 frames per second. The shooter can, optionally, save this entire photographic sequence as a moving, camcorder version of his or her shooting experience, by switching the photographic firearm apparatus into "camcorder" mode. However, if the shooter is primarily interested in saving selected still photographs of the shooting, then the actual firing of the weapon defines the critical reference time relative to which these selected still photographs are to be identified. Thus, for example, the shooter may wish to save still photographs taken while the target is sighted through photographic firearm apparatus 1, before the shot is fired. Or, the shooter may desire to save photographs taken just after the shot is fired, but before impact. Or, for macabre tastes, the shooter may wish to preserve a picture showing the precise moment of impact. In all events, the moment of firing establishes time "zero," and the still photographs to be preserved will be defined either at x seconds before firing (zero minus x) or at x seconds after firing (zero plus x). Whatever preferences the hunter may have in this regard (e.g., camcorder moving picture option, still photographs at specified times before or after firing), these are programmed by programming means 115 into a timing control computer 110, the operation of which will be described in further detail below.

In the prior art discussed earlier, a plunger is placed proximate the rifle trigger 32, and the physical pulling of the trigger 32 also activates the plunger, which in turn activates the camera via a connecting cable. According to the present invention, this form of activation is discarded in favor of a firing detector to detect when a round actually has been fired, using either recoil or acoustic detection. Thus, in the preferred embodiment, the firing detector is an acceleration detector 111 such as an accelerometer (including micro-electro-mechanical chip-based accelerometers). In an alternative preferred embodiment, the firing detector is an acoustic detector 112 (such as a decibel meter) which detects a sudden elevation of sound level due to the firing of the weapon. In either event, the firing detector detects the precise moment at which the rifle recoils from firing, or creates a sharp sound from firing, and this information is provided via a firing signal (shown by unnumbered arrows from 111 and 112) to timing control computer 110. Timing control computer 110 is in turn interconnected and exchanges information with digital photography means 106, to identify which still photograph was recorded at time zero, and hence, to relate all other prior and subsequent stored photographs with respect to time zero. By using actual sound or motion detection in this way, the instant of firing is defined more precisely than by using a manual plunger near the trigger 32, due to variations which will occur in plunger positioning and in trigger sensitivity. In the alternative where acoustic detector 112 is used, it is preferred to provide this detector with sound shielding and to provide highest sensitivity orientation toward the housing from which the firing sound emanates. This minimizes the chance of a "false" firing being detected from other noises, e.g., the firing of a nearby weapon by someone else in the same shooting party.

Once firearm 3 has been fired and time zero established based on this actual firing, timing control computer 110 utilizes data pre-programmed (115) by the shooter to determine which images in memory 23 are to be saved for permanent reproduction, and which may be erased so that the storage space they occupy can be later reused for other images. The programming (115) of timing control computer 110 can be achieved in a variety of ways all of which will be obvious to someone of ordinary skill. A few examples are provided below for illustration, not limitation.

Generally, the saving/identification of still photographs in memory 23 for permanent reproduction will proceed based on the time of firing (time zero), and/or the time of impact (time zero, plus bullet travel time from rifle to impact). Additionally, to supplement the above, an optional viewing monitor 113 which is either attached directly to or can be plugged into photographic firearm apparatus 1 is used to manually sequence through and view images stored in memory 23, so that images to be saved and discarded can be manually specified. And, as noted earlier, the option exists to simply maintain the entire recorded sequence as a moving picture. Finally, photographic firearm apparatus 1 can be used as an ordinary digital camera by itself, independent of any shooting activities, by adding a standard camera activation switch 116 to initiate capture (21), processing (22) and storage (23) of a single still image. In this way, the shooter has the means readily available to take an ordinary digital photograph of a target image that he or she may not otherwise wish to fire ammunition at, without toting along an added camera.

To save images based on time of firing, the shooter preprograms computer 110 to establish how long before, or how long after firing of the rifle the desired photographs are to be. For example, a typical rifle has a lock time (the time between pulling of trigger 32 and discharge of the rifle) of approximately 7 milliseconds. If the shooter desires to preserve the photograph taken just as the trigger 32 is pulled, then computer 110 would be programmed for zero minus 0.007 seconds. This would identify and mark for permanent reproduction, the still frame taken at substantially 0.007 seconds before the recoil or sharp acoustic excitation from firing was detected. This also serves to avert the blurring of images that would naturally occur while firearm 3 is in recoil. If the shooter wishes save the images photographed, say, 0.1 second after firing (which provides time for the firearm to be stabilized after recoil and therefore for a non-blurred image to be recorded), then computer 110 is programmed for zero plus 0.1 seconds. In general, if t designates how long before (negative t) or after (positive t) firing time zero the desired image is to be, if f designates the recording frame rate (number of frames per second), and if i designates an image number, where the image recorded at firing is image number zero, images before firing are designated by a negative integer, and images after firing are designated by a positive integer, then image number of the desired image to be saved for permanent recording is easily calculated generally to be:

$$i = t \times f, \qquad (1)$$

with appropriate rounding as necessary.

To save images in relation to the time of target impact, two additional parameters must be known, namely, the distance from the rifle to the target, and the (average) speed of the bullet over that target distance.

The target distance can, of course, be estimated by the shooter and programmed into computer 110. Alternatively, a distance detector 114 such as a laser range detector is integrated into photographic firearm apparatus 1, as is already known and often practiced in the art. Distance detector 114 bounces a finely-tuned laser signal off target 100 and detects the return of that signal to the firearm. Based on the total travel time of the signal and the known speed of that signal, distance detector 114 can thus detect the distance to target 100. This distance, d, once known, is provided as input to computer 110.

The (average) bullet speed, s, can also be determined by the shooter and programmed into computer 110. Ordinarily, this is done by means of a ballistics table, in which the bullet speed is a function of the firearm caliber, the bullet type and weight, and the target distance (since the average speed is decreased for longer flight distance). Alternatively, appropriate ballistics information is pre-programmed into computer 110, so that the shooter merely specifies the firearm caliber and the bullet type/weight, with target distance provided by distance detector 114.

Thus, with distance d and speed s known, the travel time $t = t_{travel}$ from firing to impact is $t_{travel} = d/s$, and so, combining this with eq. 1, the image number of the image recorded at impact is $$i = (d/s) \times f, \qquad (2)$$

with appropriate rounding. So if the shooter desires, for example, to permanently save the image t1 seconds before (negative t1) or after (positive t1) impact, i.e., $t = t_{travel} + t1$ seconds after firing, the image number to be saved is determined, using eqs. 1 and 2, according to:

$$i = (d/s + t1) \times f, \qquad (3)$$

again, with appropriate rounding.

As noted earlier, optional viewing monitor 113 serves to further supplement all of the above. Thus, for example, if the shooter designates the desired photographs to be those taken 0.2 seconds before impact (t1=−0.2), computer 110 might identify the still photograph taken most closely to this specified time, display this photograph up on monitor 113, and enable the shooter to then scroll forward or backward through other photographs taken just after or before this photograph. Then, with the range of photographs narrowed, the shooter can manually review the photographs to make a final determination which are to be saved for printing. Similarly, it is not required that the shooter specify the desired times before firing the weapon. So long as the recordings are made in the manner described above, and the (zero) time of firing is established, the shooter can always choose photographs after firing by asking for the photograph that was already taken, e.g., 0.3 seconds before impact, or 0.2 seconds before firing, etc., as desired.

Finally, once the desired photograph or photographs have been identified and saved according to the various procedures outlined above, all that remains is the permanent recording or printing of those photographs. As noted earlier, while a wide range of storage media are suitable for image memory 23, that memory is generally either an on-board, non-removable memory, or it is removable (e.g., a removable memory card). If image memory 23 is non-removable, then the desired images are downloaded to a computer and/or printer via an download adapter 25, using devices and methods well-known in the art. If image memory 23 is removable, then an appropriate removable card or disk 26 is removed from the photographic firearm apparatus 1 as depicted, and then connected for downloading to a computer and/or printer, again, using devices and methods well-known in the art. Once the desired photographs have been printed or otherwise recorded in a download device or medium separate from photographic firearm apparatus 1, the storage locations storing the original images in the photographic firearm apparatus's image memory 23 can be erased and reused, as known in the art.

The fact that imaging processor 22 and timing control computer 110 have been illustrated herein as two distinct devices does not in any way foreclose the possibility of combining these into a single computer or processor as one mode of practicing this invention. This separation is helpful simply as a way of observing that certain processing functions standard to all digital photography are conducted by imaging processor 22, and that certain other timing and image selection functions specifically required for this invention but not generally needed for digital photography are conducted by timing control computer 110. Again, however, one of ordinary skill can readily combine these processors, as well as any memories needed to support their operation, into a single computing/processing device.

Further, while imaging processor 22 and timing control computer 110 perform various processing functions as described above, it is certainly possible to perform some of the processing steps (e.g., flipping the image, removal or addition or crosshairs, etc.) using an external computer, after the desired images have been downloaded (25) or removed (26). Color, brightness, contrast, sharpness, and many other features of the photographs can easily be modified using computerized image processing techniques that are well-known in the art. The fact that some processing functions may be carried on externally, rather than internally to photographic firearm apparatus 1, is obvious, and is fully considered to be within the scope of this invention.

Finally, it is to be observed that FIGS. 1, 2, 4 and 5 schematically illustrate the operation of this invention by showing novel interrelationships among known elements such as digital imaging array 21, imaging processor 22, image memory 23, digital photography means 106, timing control computer 110, accelerometer 111, acoustic detector 112, etc., so as to yield the invention as a whole disclosed and claimed herein. The actual physical positions of these various elements within the photographic firearm apparatus can be varied as desired to optimize compactness, weight balance, component interrelationships, etc., and so the specific positioning illustrated in these figures should not be considered to limit this disclosure and its claims with respect to the many options available for practicing this invention.

The net result, illustrated by FIGS. 3 and 6, is that this invention allows the photographic and timing elements described above to be fully and completely integrated into a unitary photographic firearm apparatus 1 that is attached (31) to a firearm 3 and used during shooting just as any ordinary rifle scope or pistol attachment, without any additional steps. In the embodiment of FIG. 1, photographic firearm apparatus 1 is universally adaptable to a wide variety of rifles to the same degree as any conventional scope. In the embodiment of FIG. 4, photographic firearm apparatus 1 attaches 31 through any of a variety of mounting means that would be obvious to someone of ordinary skill, to a pistol or similar small firearm. Alternatively, photographic firearm apparatus 1 can be manufactured as part of the rifle, pistol or other firearm at the outset, rather than as a separate add-on unit for later attachment.

There is no cumbersome interference with or connection required to the firearm trigger 32, because of the combination with acoustical and/or recoil detection rather than a physical plunger and cable. The use of compact digital photography components enables all photographic components to be tightly integrated and embodied into a single photographic firearm apparatus 1 without materially altering the photographic firearm apparatus's size, weight distribution, or shape, which in turn contributes to the fact that photographic firearm apparatus 1 can be attached and used in hunting just like a conventional scope (FIG. 3), or can be easily mounted to a pistol or small firearm (FIG. 6). Cumbersome camera adapters, separate cameras, and interfering triggering cables are totally avoided. Additionally, these digital photography elements, in combination with acoustical and/or recoil detection, enable the very exact photographic precision described above, which cannot be achieved by a conventional film/chemically-based camera, or by manual triggering of the camera via a plunger and cable.

While this disclosure refers throughout to a rifle or pistol, and to a photographic firearm apparatus, it is understood that this invention can be applied generally to any firearm which utilizes a scope for viewing the target, as well as, in the embodiment of FIGS. 4 through 6, to any firearm that does not use a scope, but instead relies on direct line of sight. While this disclosure discusses the use of this device in connection with hunting or shooting (or target practice), it is understood that other applications are also envisioned within the scope of this disclosure. For example, a police department may wish to monitor the use of weapons by its officers by requiring them to utilize the photographic features of this invention whenever a weapon is fired at a suspect being pursued. Similar use can be envisioned for military applications. And, indeed, this invention can be utilized in any situation where it may be desired or required to capture a photographic record of the discharge of a firearm.

As is known in the art, a firearm 3 such as a pistol may optionally comprise a laser 61 which emits a sharp laser beam 62 toward the target and casts a "spot" of light on the target near where the bullet is expected to impact, as a means of enhancing shooting accuracy. The use of such a laser 61 as part of firearm 3, or as part of photographic firearm apparatus 1, in combination with the other features of the invention as disclosed, is fully considered to be within the scope of this invention and its associated claims.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A method for recording photographs in connection with the firing of a firearm, comprising the step of:

saving photographic images of a target based on detecting an actual discharge of live ammunition from the firearm toward said target, in combination with stored data from a user of said method specifying timing relative to discharge, of photographic images which are to be saved.

2. The method of claim 1, said detecting said actual discharge comprising detecting a recoil of the firearm.

3. The method of claim 1, said detecting said actual discharge comprising detecting a sound of the firearm discharging.

4. The method of claim 1, further comprising the step of using a firearm scope for saving said photographic images and detecting said actual discharge.

5. The method of claim 4, further comprising the step of attaching and detaching said firearm scope to and from said firearm.

6. The method of claim 4, further comprising the step of providing the firearm with said firearm scope integral thereto.

7. The method of claim 1, further comprising the step of using the firearm for saving said photographic images and detecting said actual discharge.

8. The method of claim 1, further comprising the step of additionally saving said photographic images based on determining a travel time of said live ammunition to said target.

9. A photographic firearm apparatus, comprising:

discharge detecting means for detecting an actual discharge of live ammunition from a firearm toward a target;

a timing control computer for receiving a firing signal from said discharge detecting means indicating that said actual discharge has occurred; and image saving means for saving photographic images of said target responsive to said timing control computer, based on said firing signal, in combination with stored data from a user of said apparatus specifying timing relative to discharge, of photographic images which are to be saved.

10. The apparatus of claim 9, said discharge detecting means comprising an acceleration detector for detecting a recoil of the firearm.

11. The apparatus of claim 9, said discharge detecting means comprising an acoustic detector for detecting a sound of the firearm discharging.

12. The apparatus of claim 9, wherein a firearm scope comprises said photographic firearm apparatus.

13. The apparatus of claim 12, wherein said firearm scope is attachable to and detachable from the firearm.

14. The apparatus of claim 12, wherein said firearm scope is integral with the firearm.

15. The apparatus of claim 9, wherein the firearm comprises said photographic firearm apparatus.

16. The apparatus of claim 9, further comprising:

travel time determination means for determining a travel time of said live ammunition to said target; and said image saving means additionally for saving said photographic images based on said determining said travel time.

* * * * *